US009065897B2

(12) United States Patent
Haghgou et al.

(10) Patent No.: US 9,065,897 B2
(45) Date of Patent: Jun. 23, 2015

(54) SYSTEM AND METHOD FOR BLOCKING UNAUTHORIZED OUTGOING CALL ON A COMMUNICATION NETWORK

(71) Applicants: Seyed Ahmad Haghgou, Tehran (IR); Alex Hagoo, Phoenix, AZ (US)

(72) Inventors: Seyed Ahmad Haghgou, Tehran (IR); Alex Hagoo, Phoenix, AZ (US)

( * ) Notice: Subject to any disclaimer, the term of this patent is extended or adjusted under 35 U.S.C. 154(b) by 0 days.

(21) Appl. No.: 14/101,720

(22) Filed: Dec. 10, 2013

(65) Prior Publication Data

US 2014/0099926 A1  Apr. 10, 2014

(51) Int. Cl.
- H04M 3/00 (2006.01)
- H04M 1/66 (2006.01)
- H04M 3/20 (2006.01)
- H04M 1/677 (2006.01)

(52) U.S. Cl.
CPC ............... H04M 3/20 (2013.01); H04M 1/677 (2013.01)

(58) Field of Classification Search
CPC ..................................................... H04M 1/677
USPC ................................................. 379/188, 200
See application file for complete search history.

(56) References Cited

U.S. PATENT DOCUMENTS

| 4,346,264 | A | * | 8/1982 | Sharvit ........................ 379/198 |
| 4,866,762 | A | * | 9/1989 | Pintar .......................... 379/200 |
| 5,200,995 | A | * | 4/1993 | Gaukel et al. ................. 379/200 |
| 5,638,428 | A | * | 6/1997 | Berku et al. ............. 379/100.06 |
| 5,802,157 | A | * | 9/1998 | Clarke et al. ................. 379/196 |
| 5,925,132 | A | * | 7/1999 | Kadokura ..................... 713/323 |
| 6,330,317 | B1 | * | 12/2001 | Garfinkel ...................... 379/196 |
| 7,418,089 | B2 | * | 8/2008 | Tiliks et al. ................... 379/196 |
| 2005/0096009 | A1 | * | 5/2005 | Ackley .......................... 455/405 |

* cited by examiner

*Primary Examiner* — Nafiz E Hoque
(74) *Attorney, Agent, or Firm* — Barry Choobin; Patent 360

(57) ABSTRACT

The various embodiments herein provide a system and method for blocking unauthorized outgoing calls made by an unauthorized user. The system is programmed by the user to block any attempt made to call an unauthorized number. Incase of a landline system, the system is connected to a telephone line that powers up the unit from the landline and blocks any unauthorized outgoing calls. The system is programmed to inhibit dialing any prefixes or any individual numbers. The system disconnects the phone line from the network and does not allow continuation of dialing when the prefix or the dialing number matches with the unauthorized dialing list/database.

13 Claims, 3 Drawing Sheets

SYSTEM AND METHOD FOR BLOCKING UNAUTHORIZED OUTGOING CALL ON A COMMUNICATION NETWORK

BACKGROUND

1. Technical Field

The embodiments herein generally relate to a communication system and method. The embodiments herein particularly relate to a method and system for barring an outgoing call and enabling security in a landline or mobile communication system. The embodiments herein more particularly relate to a method and system for blocking or restricting a dialing of unauthorized call on a communication device such as a landline telephone or a cellular phone.

2. Description of the Related Art

Communication Fraud is the use of telecommunications products or services without any authorization to the product or service. Many operators have increased measures to minimize the fraud and reduce their losses.

A Zero blocker is available in market as a primary type of phone dialing blocker. The zero blocker is used to block only zero and not any other numbers. Further the zero blocker is not able to block or unblock any specific number. The zero blockers are not provided with any timer, which is associated with the blocking of any specific number. The zero blocker is not provided with any parental capabilities. The zero blocker is not able to bypass all the blocked numbers for certain period such as emergency. The zero blockers are provided with mechanical switch or relay only. The disadvantage with this blocker is that the blocker does not allow a dialing of numbers beginning with zero even after enabling a dialing operation unless a line manager is referred to an installer to unblock a zero dialing. These blockers are inefficient, as the users cannot dial numbers like line manager's mobile phone number and hence the telephone line becomes a limited device and does not allow zero dialing in case of emergency.

The zero blockers capable of blocking numbers with two zeros or probably nine are also developed and available in the market. All of these telephone blockers are provided with the physical circuits and hence they are not programmable. As a result, they are not capable of blocking any other dialed digital numbers.

Hence there is a need for a system and method to eliminate any attempt to dial an unauthorized call on a landline or in a cellular network. There is also need for a method and system for restricting an unauthorized use of a communication device.

The above-mentioned shortcomings, disadvantages and problems are addressed herein and which will be understood by reading and studying the following specification.

OBJECTS OF THE EMBODIMENTS

The primary object of the embodiments herein is to provide an intelligent and programmable system and method to block any unauthorized outgoing calls on a landline phone or in a mobile phone.

Another object of the embodiments herein is to provide a method and system with an application installed in a Smartphone to eliminate an attempt to dial an unauthorized call.

Yet another object of the embodiments herein is to provide a method and system to block any telephone prefix or numbers such as 1-12 digit blocks.

Yet another object of the embodiments herein is to provide a method and system to unblock any telephone prefix or numbers such as 1-12 digit blocks.

Yet another object of the embodiments herein is to provide a method and system to enable a usage of a telephone after installation as the system is programmed to block or unblock any outgoing call.

Yet another object of the embodiments herein is to provide a method and system to block any unauthorized outgoing calls on a landline phone or in a mobile phone and to change access using telephone device line manger.

Yet another object of the embodiments herein is to provide a method and system to block any unauthorized outgoing calls on a landline phone or in a mobile phone and for producing different tones and recording the generated tones in a memory for noticing by a user or programmer.

Yet another object of the embodiments herein is to provide a method and system to block any unauthorized outgoing calls on a landline phone or in a mobile phone and to enable a resetting to a manufacturer default settings using an internal switch in case of forgetting an access code or occurring a problem due to programming.

Yet another object of the embodiments herein is to provide a method and system to block any unauthorized outgoing calls on a landline phone or in a mobile phone even due to a lack of any mechanical or electromechanical device like locks or relays in the circuit.

Yet another object of the embodiments herein is to provide a method and system to block any unauthorized outgoing calls on a landline phone or in a mobile phone, which is easily installed using only two non-directed wires in series in an input section of a telephone line.

Yet another object of the embodiments herein is to provide a method and system to block any unauthorized outgoing calls on a landline phone or in a mobile phone so that the system is capable of being used as an ordinary zero-blocker.

Yet another object of the embodiments herein is to provide a method and system to block any unauthorized outgoing calls on a landline phone or in a mobile phone so that the system is capable of being used as a conditional and programmed zero-blocker Yet another object of the embodiments herein is to provide a method and system to block any unauthorized outgoing calls on a landline phone or in a mobile phone to enable a dialing of numbers beginning with zero based on a need of a line manager.

Yet another object of the embodiments herein is to provide a method and system to block any unauthorized outgoing calls on a landline phone or in a mobile phone so that the system enables to permit a personnel to dial predefined zero or double-zero numbers, but to prevent or prohibit the personnel to dial other costly numbers in companies, factories or offices.

Yet another object of the embodiments herein is to provide a method and system to block any unauthorized outgoing calls on a landline phone or in a mobile phone so that a line manager is able to use the system to block some non-zero numbers, which are defined as inappropriate.

Yet another object of the embodiments herein is to provide a method and system to block any unauthorized outgoing calls on a landline phone or in a mobile phone so that the system is provided with a wide range of opportunities in different situations for satisfying a need of a line manager.

These and other objects and advantages of the present invention will become readily apparent from the following detailed description taken in conjunction with the accompanying drawings.

SUMMARY

The various embodiments herein provide a system and method for blocking unauthorized calls made by an unauthorized user. According to an embodiment herein, a system is provided for blocking unauthorized calls made by an unauthorized user. The system is programmed by a user to block any attempt to call an unauthorized number. In a telephone landline system, the system is connected to a telephone line that powers up a unit from the landline and blocks any unauthorized outgoing calls. The system is programmed to inhibit a dialing of any prefixes or any individual numbers. The system disconnects the phone line from the network and does not allow a continuation of dialing, when the prefix or the dialing number matches with the unauthorized dialing database.

According to one embodiment herein, the system comprises at-least two wires that are connected in series with the phone line. The system is installed at a main line or the system is connected to any individual telephone set.

According to one embodiment herein, the system comprises a LED and a push button switch. The LED indicates an on/off status of the system and the push button switch is for resetting the password to the default.

According to one embodiment herein, the system further comprises a voltage converter, a line disconnection control circuit to disconnect the line, a power saver circuit to save power for a pre-determined time such as 5 seconds, a tone decoder, a pulse detector, a microcontroller, a tone generator, a LED controller and a reset circuit.

According to one embodiment herein, the power supply circuit converts a supply from phone line to +5V DC. The 5V DC is a main power for the system.

According to one embodiment herein, a line-disconnection control circuit disconnects the phone line after a pre-determined time period such as 3 seconds, in case of an unauthorized call attempt.

According to one embodiment herein, the system further comprises a power saver circuit for saving the power for a pre-determined time period such as 5 seconds and provides the stored/saved power to the rest of the circuit, when the line disconnection control circuit is active.

According to one embodiment herein, a tone decoder circuit decodes all the dual-tone-multi-frequency (DTMF) tones from the phone line and provides the information to the microcontroller.

According to one embodiment herein, a pulse detector circuit detects the dialing pulses on the line.

According to one embodiment herein, the microcontroller is the brain of the system. A list of unauthorized numbers is saved on an EEPROM memory of the microcontroller with the help of a telephone set. The list of unauthorized numbers is protected by the password. The password is allowed to be changed only by the user of system. The microcontroller compares the dialed number with the list of unauthorized numbers. The microcontroller disconnects the call, when the dialed number matches with a number in the stored list of unauthorized numbers.

According to one embodiment herein, the tone generator provides a feedback in the form of a tone for accepting a command during a programming operation.

According to one embodiment herein, the LED controller provides a visual indication to indicate that the system is active and being programmed.

According to one embodiment herein, the system is switched to a default setting mode, by pressing the reset switch which is provided on the system. By setting the system to a default setting mode, the password of system is changed to a default password such as "1234" and the list of numbers to be blocked is erased from the system memory.

According to an embodiment herein, a method is provided for blocking an unauthorised outgoing call from a phone device such as telephone or mobile phone. The method comprises the steps of setting a password for the system; accessing the system by entering the password; erasing a previous data from a system memory; loading the memory with a list of unauthorised numbers; initializing a call by dialing a number; comparing the dialed number with the list of unauthorised numbers stored in the memory and blocking the call when the dialed number matches with a number in unauthorised list.

According to one embodiment herein, the user provides a password and enters a required set of commands to re-program the system. For example "1234" is the password and "X" is the command. The user enters 001234X# as input to configure the system. "X" is one of the following commands.
X=0 to Block a number
X=1 to Unblock a number
X=2 to Delete a number
X=6 to Change password
X=7 to Restricted call time
X=8 to Reset to default setting
X=9 to Access the line without any restriction
For example: when the user wants to block a number XXXX, then the user enters 0012340# command followed with the number XXXX that is to be blocked. The number XXXX is added into the list of unauthorized numbers and the number XXXX is blocked by the system.

According to one embodiment herein, an application is provided for a cellular communication device such as but not limited to Mobile phone, Smartphone, Palm top, tablet etc, to block the unauthorised outgoing calls.

The various embodiments herein provide a low cost system for blocking or restricting and unblocking or allowing any prefixes or numbers up to 13 digits. The system is easy to install and simple to use. The system is programmable even after an installation. The system is accessed with the password. The password ensures a security of the system. The system further allows a modification of the password. The system is restored to the default settings by using a reset switch.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1A:
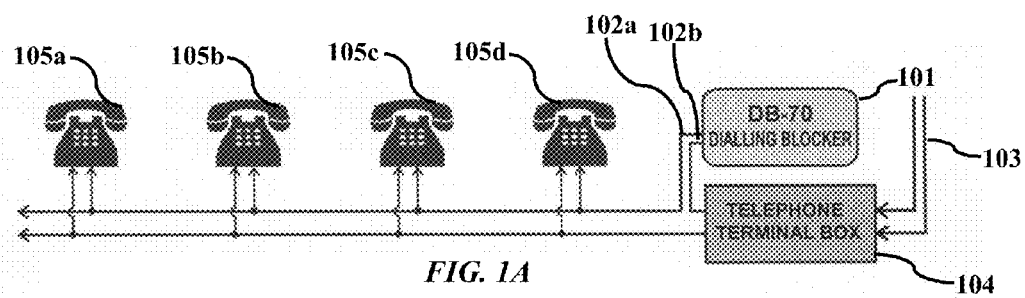
FIG. 1A-FIG. 1C illustrate a block diagram of telephone network system installed with a system for restricting an unauthorized dialing of outgoing calls in a communication device, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method and system to block unauthorized calls made by an unauthorized user. According to an embodiment herein, a system is provided to block unauthorized outgoing calls made by an unauthorized user. The system is programmed by the user to block any attempt made to call an unauthorized number. Incase of a landline telephone system, the system is connected to a telephone line that powers up the unit from landline and blocks any unauthorized outgoing calls. The system is programmed to inhibit dialing of any prefixes or any individual numbers. The system disconnects the phone line from the network and does not allow continuation of dialing, if the prefix or the dialing number matches with the unauthorized dialing list or database.

According to one embodiment herein, the system for blocking unauthorized outgoing calls comprises a voltage converter for converting a supply voltage from a phone line to +5V DC, a first circuit for disconnecting a telephone line, a second circuit for saving power for a pre-determined time period, a microcontroller comprising a list of unauthorized numbers and the list of unauthorized numbers are saved on an EEPROM memory of the microcontroller, a tone decoder circuit for decoding dual-tone-multi-frequency (DTMF) tones from the phone line and the decoded dual-tone-multi-frequency (DTMF) tones are sent to the microcontroller, a pulse detector for detecting a dialing pulse on a telephone line and the detected dialing pulse is sent to the microcontroller, a beep generator for providing a feedback in a form of a tone for accepting a command during a programming operation, a LED controller for providing a visual indication for indicating an ON/OFF status of the system, a reset circuit for switching the system to a default mode and a ISP programming interface for providing a programming and a reprogramming ability to the microcontroller. The first circuit is a line break control circuit. The second circuit is a power saver circuit.

According to one embodiment herein, a list of unauthorized numbers is protected by a password in the system. The password is allowed to be changed only by the authorised user of the system.

According to one embodiment herein, the microcontroller determines the dialed number by a dialing the pulse received from the pulse detector circuit and the decoded dual-tone-multi-frequency (DTMF) tones received from the tone decoder circuit.

According to one embodiment herein, the microcontroller compares the dialed number with a list of unauthorized numbers saved in the EEPROM memory for each time. The microcontroller sends a command to the first circuit to disconnect a call, when the dialed number does not match with the list of stored unauthorized numbers saved in the EEPROM memory.

According to one embodiment herein, the first circuit (line breaking control circuit) disconnects the telephone line after a pre-determined time period for an unauthorized outgoing call attempt.

According to one embodiment herein, the system is connected in series with the telephone line. The system comprises at-least two wires for connecting in series with the telephone line.

According to one embodiment herein, the system is installed at a telephone terminal point for blocking the unauthorized outgoing calls from a plurality of telephones connected to a terminal point.

According to one embodiment herein, the system is installed at a telephone line for blocking unauthorized outgoing calls from the plurality of telephones connected to a respective telephone line.

According to one embodiment herein, the system is installed at a particular telephone for blocking all the unauthorised outgoing calls from the particular telephone.

According to one embodiment herein, the password is changed to default, when the system is switched to a default mode.

According to one embodiment herein, the list of numbers to be blocked is erased from the EEPROM memory, when the system is switched to default mode.

The embodiments herein provide a method for blocking unauthorized calls. According to an embodiment herein, the method for blocking unauthorized calls comprises the steps of setting a password for the system, accessing the system by entering the password, erasing a previous data from the EEPROM memory of the system, loading a list of unauthorised numbers to the EEPROM memory, initializing a phone call by dialing a number in a telephone, comparing the dialed number with the list of unauthorised numbers stored in the EEPROM memory and blocking the phone call when the dialed number matches with a number in the list of unauthorised list.

According to one embodiment herein, the authorized user provides a password to access the system. The authorized user provides one or more commands to re-program the system.

According to one embodiment herein, the method for blocking unauthorized calls in a cellular communication device comprises an application. The application is installed in the cellular communication device such as but not limited to Mobile phone, Smartphone, Palm top, tablet, for block unauthorised outgoing calls.

The various embodiments herein provide a system and method for blocking unauthorized calls made by an unauthorized user. According to an embodiment herein, a system is provided for blocking unauthorized calls made by an unauthorized user. The system is programmed by a user to block any attempt to call an unauthorized number. In a telephone landline system, the system is connected to a telephone line that powers up a unit from the landline and blocks any unauthorized outgoing calls. The system is programmed to inhibit a dialing of any prefixes or any individual numbers. The system disconnects the phone line from the network and does not allow a continuation of dialing, when the prefix or the dialing number matches with the unauthorized dialing database.

According to one embodiment herein, the system comprises at-least two wires that are connected in series with the phone line. The system is installed at a main line or the system is connected to any individual telephone set.

According to one embodiment herein, the system comprises a LED and a push button switch. The LED indicates an on/off status of the system and the push button switch is for resetting the password to the default.

According to one embodiment herein, the system further comprises a voltage converter, a line disconnection control circuit to disconnect the line, a power saver circuit to save power for a pre-determined time such as 5 seconds, a tone decoder, a pulse detector, a microcontroller, a tone generator, a LED controller and a reset circuit.

According to one embodiment herein, the power supply circuit converts a supply from phone line to +5V DC. The 5V DC is a main power for the system.

According to one embodiment herein, a line-disconnection control circuit disconnects the phone line after a pre-determined time period such as 3 seconds, in case of an unauthorized call attempt.

According to one embodiment herein, the system further comprises a power saver circuit for saving the power for a pre-determined time period such as 5 seconds and provides the stored/saved power to the rest of the circuit, when the line disconnection control circuit is active.

According to one embodiment herein, a tone decoder circuit decodes all the dual-tone-multi-frequency (DTMF) tones from the phone line and provides the information to the microcontroller.

According to one embodiment herein, a pulse detector circuit detects the dialing pulses on the line.

According to one embodiment herein, the microcontroller is the brain of the system. A list of unauthorized numbers is saved on an EEPROM memory of the microcontroller with the help of a telephone set. The list of unauthorized numbers is protected by the password. The password is allowed to be changed only by the user of system. The microcontroller compares the dialed number with the list of unauthorized numbers. The microcontroller disconnects the call, when the dialed number matches with a number in the stored list of unauthorized numbers.

According to one embodiment herein, the tone generator provides a feedback in the form of a tone for accepting a command during a programming operation.

According to one embodiment herein, the LED controller provides a visual indication to indicate that the system is active and being programmed.

According to one embodiment herein, the system is switched to a default setting mode, by pressing the reset switch which is provided on the system. By setting the system to a default setting mode, the password of system is changed to a default password such as "1234" and the list of numbers to be blocked is erased from the system memory.

According to an embodiment herein, a method is provided for blocking an unauthorised outgoing call from a phone device such as telephone or mobile phone. The method comprises the steps of setting a password for the system; accessing the system by entering the password; erasing a previous data from a system memory; loading the memory with a list of unauthorised numbers; initializing a call by dialing a number; comparing the dialed number with the list of unauthorised numbers stored in the memory and blocking the call when the dialed number matches with a number in unauthorised list.

According to one embodiment herein, the user provides a password and enters a required set of commands to re-program the system. For example "1234" is the password and "X" is the command. The user enters 001234X# as input to configure the system. "X" is one of the following commands.

X=0 to Block a number
X=1 to Unblock a number
X=2 to Delete a number
X=6 to Change password
X=7 to Restricted call time
X=8 to Reset to default setting
X=9 to Access the line without any restriction For example: when the user wants to block a number XXXX, then the user enters 0012340# command followed with the number XXXX that is to be blocked. The number XXXX is added into the list of unauthorized numbers and the number XXXX is blocked by the system.

According to one embodiment herein, an application is provided for a cellular communication device such as but not limited to Mobile phone, Smartphone, Palm top, tablet etc, to block the unauthorised outgoing calls.

The various embodiments herein provide a low cost system for blocking or restricting and unblocking or allowing any prefixes or numbers up to 13 digits. The system is easy to install and simple to use. The system is programmable even after an installation. The system is accessed with the password. The password ensures a security of the system. The system further allows a modification of the password. The system is restored to the default settings by using a reset switch.

Figure 1B:
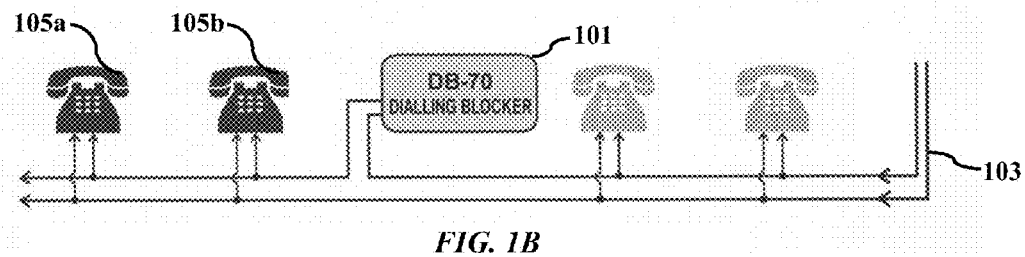
Figure 1C:
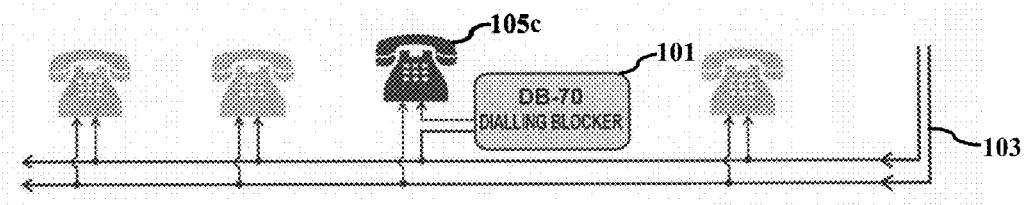

FIG. 1A-FIG. 1C illustrates a telephone line network installed with a system for blocking unauthorized outgoing calls in a telephone network, according to an embodiment herein. The system 101 comprises at-least two wires 102a and 102b connected in series with the phone line 103 as shown in FIG. 1A-FIG. 1C. With respect to FIG. 1A, the system 101 is installed at the phone terminal point 104 for blocking the unauthorized outgoing calls from all the phones 105a, 105b, 105c and 105d, which are connected to the terminal point 104. With respect to FIG. 1B, the system 101 is installed at a main phone line 103 for blocking the unauthorized outgoing calls from all the phones 105a and 105b connected to the respective phone line 103. With respect to FIG. 1C, the system 101 is installed at a particular phone 105c for blocking all the unauthorised outgoing calls from the particular phone 105c.

Figure 2:
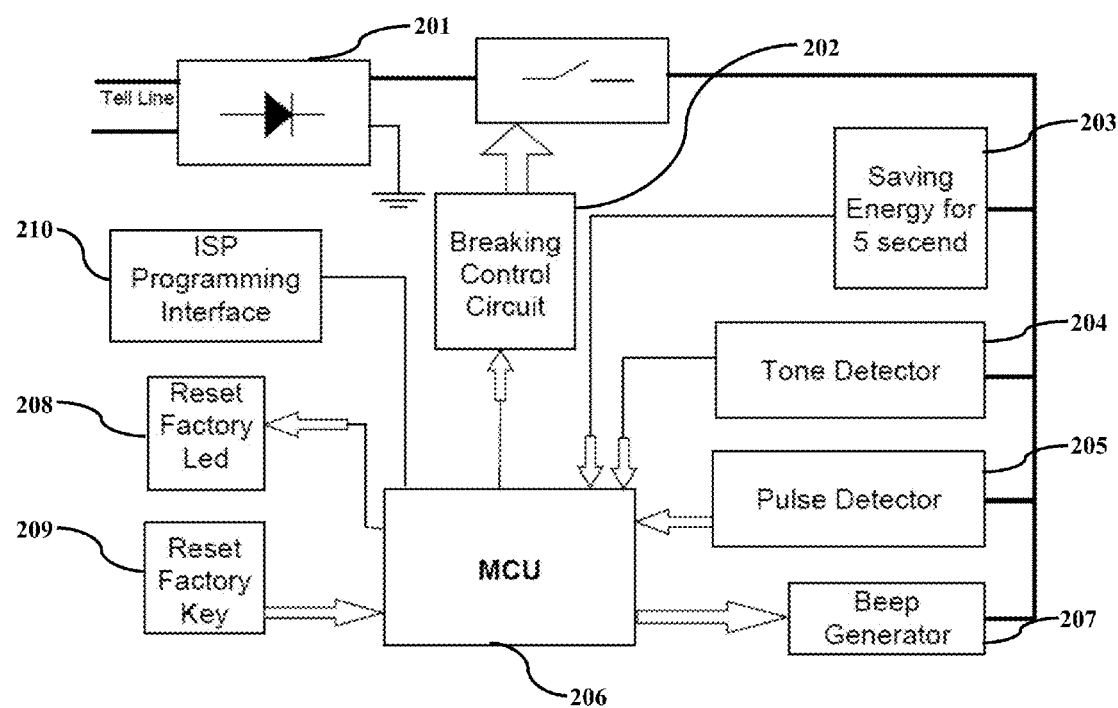
FIG. 2 illustrates a block diagram of the system for restricting an unauthorized dialing of outgoing calls in a communication device, according to an embodiment herein.

FIG. 2 illustrates a block diagram of the system for restricting an unauthorized outgoing call from a communication device, according to an embodiment herein. The system comprises a voltage converter 201, a disconnection control circuit to disconnect the line by using a line breaking control circuit 202, a power saver circuit to save power for a pre-determined time period such as 5 seconds 203, a tone decoder 204, a pulse detector 205, a microcontroller 206, a tone/beep generator 207, a LED controller (reset factory LED) 208, a reset circuit (reset factory key) 209 and a ISP programming interface 210. The power supply unit 201 converts the supply voltage from phone line to +5V DC. The 5V DC is the main power for the system. The circuit adopted in the system saves the power for a pre-defined time period such as 5 seconds 203 and provides the power to the rest of circuit at the time, when the line breaking control circuit 202 is active. The tone decoder circuit 204 of the system decodes the dual-tone-multi-frequency (DTMF) tones from the phone line and provides the information to the microcontroller 206. The pulse detector circuit 205 detects the dialing pulses on the phone line and provides the data to the microcontroller 206. The microcontroller 206 is the brain of the system. The list of unauthorized numbers is saved on an EEPROM memory of the microcontroller 206 with the use of telephone set. The list of unauthorized numbers is protected by the password. The password is allowed to be changed only by the user (administrator) of the system. The microcontroller 206 determines the dialed number by using the information from the pulse decoder 205 and tone decoder 204. The microcontroller 206 further compares the dialed number with the list of unauthorized numbers. When a dialed number matches with a number listed in unauthorized list, the microcontroller 206 sends the command to the line breaking control circuit 202 to disconnect a call. The line breaking control circuit 202 disconnects the phone line after a pre-determined time period such as 3 seconds of an unauthorized call attempt. The tone generator 207 provides a feedback in the form of a tone for accepting a command during a programming operation. The LED controller 208 provides a visual indication that the system is active and being programmed. The system is switched to the default mode by pressing the reset switch 209 provided in the system. The ISP programming interface 210 provides a programming and a reprogramming ability to the microcontroller 206. Further, a hex file is burned into the microcontroller 206 through the ISP programming interface 210.

Figure 3:
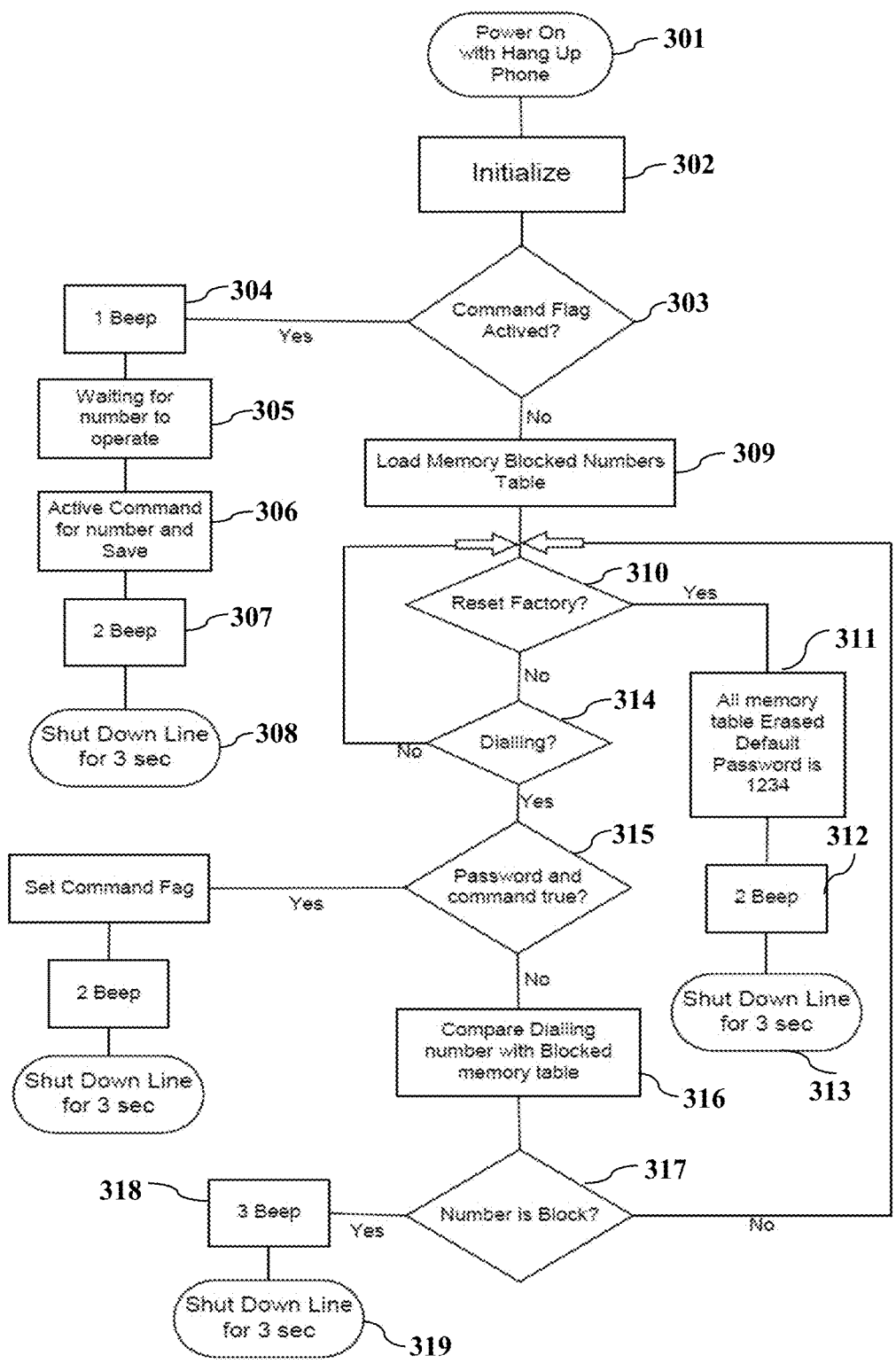
FIG. 3 illustrates a flowchart indicating a method for blocking an unauthorized outgoing call to an unauthorized number using the system for restricting an unauthorized dialing of outgoing calls in a communication device, according to an embodiment herein.

FIG. 3 illustrates a flowchart explaining a method for blocking an outgoing call to an unauthorized number, according to an embodiment herein. With respect to FIG. 3, the phone is activated by either powering up the phone or by hanging up the phone (301). The system is initialized as soon as the phone is activated (302). The system checks whether the user is dialing numbers to make a call or to configure the system (303). When the system recognises that the user wants to configure the system, the system notifies the user to enter the command by sending a beep tone (304). The system waits till the user enters the command (305). Once the command is entered by the user, the system activates the command and saves the required settings (306). Further, the system sends a second beep tone to notify the user that the required setting is made (307). After completion of the setting process the phone line is shut down for a pre-determined time period such as 3 seconds (308). When the user dials a number to make a call, the system loads the memory with list of numbers to be blocked (309). The system further checks whether the user plans to reset the system to the factory reset conditions (310). When the system receives a reset command from the user, the system erases the blocked number list from the memory and sets the default password such as "1234", (311). Further, the system intimates the user by sending a beep tone (312) and shuts down the phone line for a pre-determined time period such as 3 seconds (313). When the user dials a number to make a call (314), the system the authentication of the input password and command (315). When the input password and the command are correct and are authenticated, the system compares the dialed number with the list of unauthorized numbers (316). When the dialed number matches with a number in the unauthorized list (317), the system sends a disconnecting tone to the user (318) and disconnects the call after a pre-determined time period such as 3 seconds, (319). When the input password and the command are not correct, a command flag is set, a two beep tone is issued and the telephone line is but down for a predefined time such as 3 seconds.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments, which as a matter of language might be said to fall there between.

What is claimed is:

1. A system for blocking unauthorized outgoing calls, the system comprising:
    a voltage converter for converting a supply voltage from a telephone line +5 volt direct current (DC);
    a first circuit, disconnecting a telephone line, and wherein the first circuit is a line break control circuit;
    a second circuit for saving power for a pre-determined time period, and wherein the second circuit is a power saver circuit, and wherein the power saver circuit is designed for saving power for the pre-determined time period, and wherein the power saver circuit is designed to provide the saved power to rest of circuits, when the line break control circuit is active;
    a microcontroller comprising a list of unauthorized numbers, and wherein the list of unauthorized numbers are saved on an electrically erasable programmable read only memory (EEPROM) of the microcontroller;
    a tone decoder circuit for decoding a dual-tone-multi-frequency (DTMF) tones from the telephone line, and wherein the decoded DTMF tones are sent to the microcontroller;
    a pulse detector for detecting a dialing pulse on the telephone line, and wherein the detected dialing pulse is sent to the microcontroller;
    a beep generator for providing a feedback in the form of a tone for accepting a command during a programming operation;
    a light emitting diode (LED) controller for providing a visual indicating an ON/OFF status of the system;
    a reset circuit for switching the system to a default mode; and
    a programming interface for providing a programming and a reprogramming capability to the microcontroller.

2. The system according to claim 1, wherein the list of unauthorized numbers is protected by a password, and wherein the password is allowed to be changed only by the authorized user of the system.

3. The system according to claim 1, wherein the microcontroller determines a dialled number by the dialling pulse received from the pulse detector circuit and a plurality of decoded dual-tone-multi-frequency (DTMF) tones received from the tone decoder circuit.

4. The system according to claim 1, wherein the microcontroller compares the dialled number with the list of unauthorized numbers saved in the EEPROM memory for each time a dialling process is initiated, and wherein the microcontroller sends a command to the first circuit to disconnect a call, when the dialled number does not match with the list of stored unauthorized numbers saved in the EEPROM memory.

5. The system according to claim 1, wherein the first circuit disconnects the telephone line after a pre-determined time period for an unauthorized call attempt.

6. The system according to claim 1 is connected in series with the telephone line, and wherein the system comprises at-least two wires for connecting in series with the telephone line.

7. The system according to claim 1, wherein the system is installed to a telephone terminal point for blocking an unauthorized outgoing call from the plurality of telephones connected to the terminal point.

8. The system according to claim 1, wherein the system is installed to a telephone line for blocking the unauthorized outgoing ca from a preset number of telephones connected to a respective telephone line.

9. The system according to claim 1, wherein the system is installed to a particular telephone for blocking all the unauthorised outgoing calls from the particular telephone.

10. The system according to claim 1, wherein the password is changed to default, when the system is switched to default mode.

11. The system according to claim 1, wherein the list of numbers to be blocked is erased from the EEPROM memory, when the system is switched to default mode.

12. The system according to claim 1, further comprises an application for blocking unauthorized calls in a cellular communication device, and wherein the application is installed in the cellular communication device, and wherein the cellular communication device is selected from a group consisting of a Mobile phone, Smartphone, Palm top computing device, tablet, for block unauthorized outgoing calls.

13. The system according to claim 1, wherein an authorized user provides one or more commands to reprogram the system.

* * * * *